Patented Nov. 20, 1934

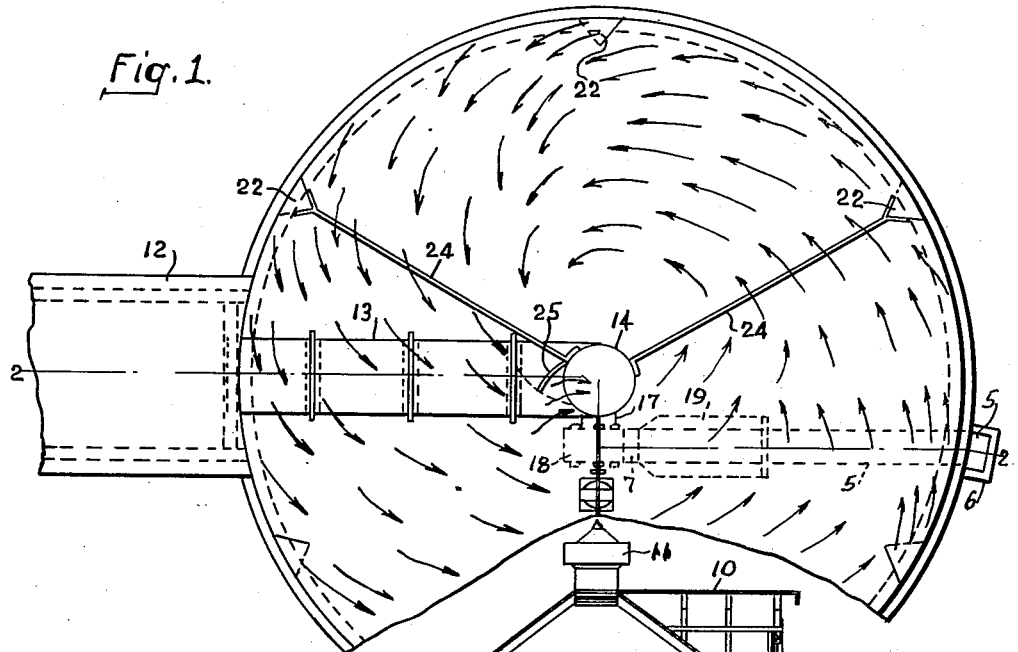
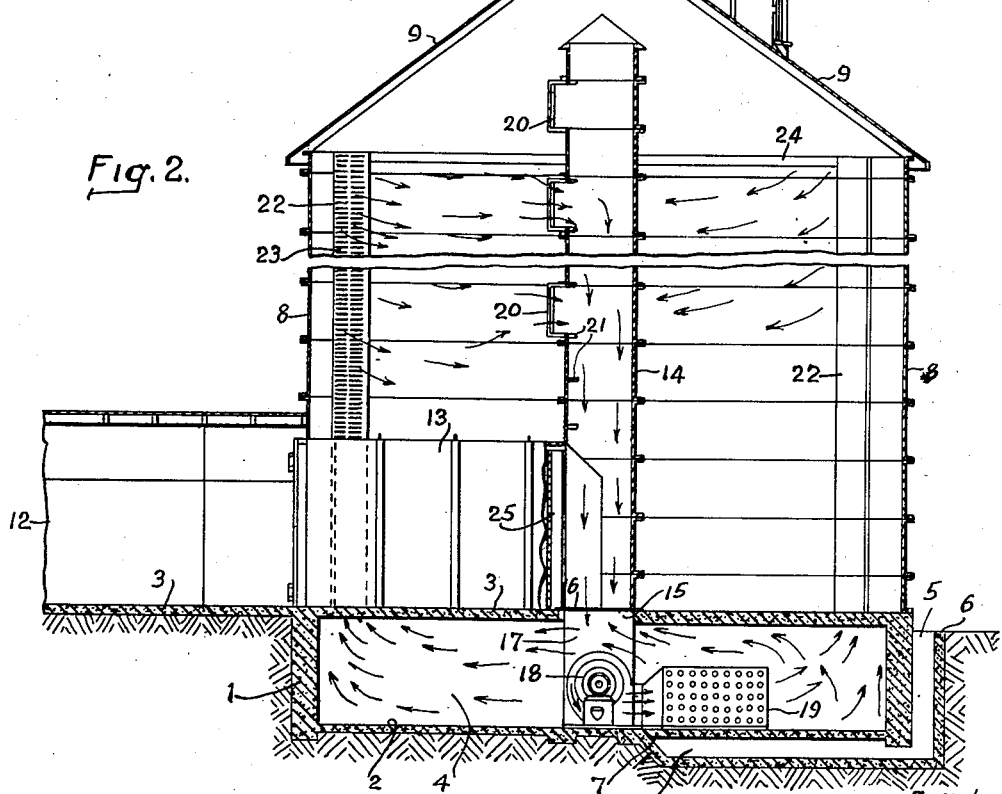

1,981,436

UNITED STATES PATENT OFFICE 1,981,436

METHOD AND APPARATUS FOR THE STORAGE, CURING, AND PRESERVATION OF HAY

John G. Shodron, Fort Atkinson, Wis., assignor to James Manufacturing Company, Fort Atkinson, Wis., a corporation of Wisconsin Original application October 14, 1932, Serial No. 637,816. Divided and this application June 14, 1933, Serial No. 675,798

4 Claims. (Cl. 34—19)

The present invention relates to an apparatus for a method of storing, curing and preserving hay, and has for its object to provide means for so storing hay that it will not be subject to spontaneous combustion. For this purpose there is provided means for causing currents of air to pass through the hay from a source of air, back to the source.

It is also an object of this invention to provide, in connection with means for creating a current of air through hay, means for heating the air and means to cause the air to enter the hay chamber downwardly with relation to the outer wall of the container for the hay.

It is also an object of this invention to provide means for ventilating and aerating hay in which the air may be recirculated or fresh air taken from outside of the hay container.

These and other advantages will appear from the following description taken in connection with the drawing.

This is a division of copending application, Ser. No. 637,816, filed October 14, 1932.

Referring to the drawing:

Figure 1 is a top plan view of the hay container with the roof removed and one side broken away.

Figure 2 is a section on the line 2—2 of Figure 1.

For supporting the superstructure there is provided a base wall 1, which may be of any suitable size and shape. This wall has a sub-floor 2 and a main floor 3, and forms with these two floors an air chamber or cellar 4. The floor 3 may extend laterally to one side of the storage building and form the floor of the stable or barn. On one side of and beneath the sub-floor is an air passageway 5 having suitable walls 6. The base wall, the floors and the walls of the passageway 5 may be formed of concrete or other suitable material.

The air passageway 5 is connected to the air chamber 4 by means of an inlet 7 in the floor 2. Supported on the base wall is a superstructure which has a wall 8 forming the outer wall of the hay container. This wall forming the container supports a roof 9, which has in one side thereof a dormer window 10, and in the top a ventilator 11 through which the air may pass from the container.

To one side of the container there is a stable 12, which is connected by means of a passageway 13 to one side of a chute 14, supported upon the central part of the floor 3. Immediately below the chute 14 the floor 3 has an opening 15 therein, provided with a grille 16. Beneath the opening 15 and the grille 16 is a passageway 17 for connecting the chute 14 to the inlet side of a blower 18, which is supported in the central part of the air chamber 4 on the floor 2, beneath the chute 14.

The outlet part of the blower is provided with a heating or cooling means 19 by which the air discharged from the blower may be either heated or cooled before it passes through the hay stored in the container. The chute has therein a plurality of doors 20, through which the air may pass into the chute after it has circulated through the hay stored in the container. There is provided inside of the chute a series of ladder runs 21.

On the inside of the container is a plurality of V-shaped ducts 22 for the purpose of circulating air through the hay within the container. The lower ends of these ducts open into the air chamber 4, while their upper ends are closed so that air forced into these ducts will pass out at the sides thereof, through louvers or slots 23. These louvers or slots may be arranged in one or two sides of each duct. In the present instance they are shown in only one side of each duct.

The upper ends of these ducts are braced by means of braces 24, which extend from the ducts to the upper end of the chute. The entrance from the passageway 13 into the chute is provided with a door 25. This door is closed in order to cause the air circulating through the chute to be drawn from the surrounding hay. The upper end of the chute is also closed. When the blower is in operation air is drawn from the chute, thereby creating a vacuum in the chute. The doors 20 being open will cause the air to pass from the hay into the chute. This air is also drawn not only from the hay but also from the ducts which are connected at their lower ends to the air chamber or cellar.

By this means there is created and maintained a circulation of air from the cellar through the hay in the container, back to the cellar. In order to supply fresh outside air the passageway 5 is provided, which opens into the air chamber adjacent the blower. The suction of the air on the chute may be regulated by opening and closing the door 25. When the door is open more or less air will be taken in to the blower through the passageway 13.

It will be understood that I desire to comprehend within my invention such modifications as come within the scope of my claims and my invention.

Having thus fully described my invention, what

I claim as new and desire to secure by Letters Patent, is:

1. In combination, a cylindrical container for hay, a plurality of vertically disposed ducts arranged about the inner wall of said container, each duct having openings, all of the openings in each duct facing tangentially in the same direction of the walls of the container, whereby air passing out of said ducts will have a circulatory motion, an axially disposed chute in the container, said chute having air inlet openings therein, a blower having an outlet communicating with the ducts and an inlet connected to the chute, whereby air may be caused to pass from the ducts to the chute and through the hay located therebetween.

2. In combination, a cylindrical container for hay, a plurality of vertically disposed ducts arranged about the inner wall of said container, each duct having slots, all of the slots of each duct facing tangentially in the same direction of the walls of the container and at an acute angle to the radius of said container to cause air coming out of said ducts to have a circulatory motion, an axially disposed chute in the container, said chute having air inlet openings therein, a blower having an outlet communicating with the ducts and an inlet connected to the chute, whereby air may be caused to pass from the ducts to the chute and through the hay located therebetween.

3. In combination, a container for hay, a plurality of vertically disposed ducts arranged about the inner wall of said container, each duct having openings, all of the openings in each duct facing in the same direction substantially parallel to the walls of the container, whereby air passing out of said ducts will have a circulatory motion, a chute in the container, said chute having air inlet openings therein, a blower having an outlet communicating with the ducts and an inlet connected to the chute, whereby air may be caused to pass from the ducts to the chute and through the hay located therebetween.

4. In combination, a container for chopped partially cured hay, a plurality of air ducts within the container located adjacent the outside wall of said container, said ducts being provided with openings, all of the openings facing in the same direction substantially parallel to the walls of the container to cause the air to have circulatory motion through the hay, a chute in the center of the container, said chute having openings in communication with the hay in said container located between said chute and said ducts, means to cause air to circulate from said ducts through the hay located between said ducts and said chute, into the chute, and back to said ducts, and means comprising an additional opening located beneath said first named openings communicating with another source of air.

JOHN G. SHODRON.